(12) United States Patent
Szucs et al.

(10) Patent No.: US 6,859,749 B2
(45) Date of Patent: Feb. 22, 2005

(54) DEVICE DIAGNOSTICS

(75) Inventors: Paul Szucs, Ostfildern (DE); Andreas Schwager, Fellbach (DE); Matthias Mayer, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 247 days.

(21) Appl. No.: 10/059,935

(22) Filed: Jan. 29, 2002

(65) Prior Publication Data

US 2002/0103612 A1 Aug. 1, 2002

(30) Foreign Application Priority Data

Jan. 31, 2001 (EP) .............................................. 01102231

(51) Int. Cl.$^7$ .............................................. G06F 19/00
(52) U.S. Cl. ........................................ 702/122; 714/25
(58) Field of Search .......................... 702/122, 35, 58, 702/182, 183, 185; 714/25, 26

(56) References Cited

U.S. PATENT DOCUMENTS

| | | | | |
|---|---|---|---|---|
| 5,724,517 A | * | 3/1998 | Cook et al. | 709/227 |
| 5,916,287 A | | 6/1999 | Arjomand et al. | 701/29 |
| 6,279,049 B1 | * | 8/2001 | Kang | 710/15 |
| 6,467,054 B1 | * | 10/2002 | Lenny | 714/42 |

FOREIGN PATENT DOCUMENTS

EP 0 939 321 9/1999

OTHER PUBLICATIONS

IEEE: "IEEE Standard for a High Performance Serial Bus" 1995, IEEE STD 1394–1995, New York, NY: IEEE, US, XP002171160.

IEEE: "ANSI/IEEE STD1212, 1994 Edition. Information Technology–Microprocessor Systems–Control and Status Registers (CSR) Architecture for Microcomputer Buses." 1994, IEEE, New York, XP002171161.

IEEE: "P1212 Draft Standard for a Control and Status Registers (CSR) Architecture for Microprocessor Buses" 'Online! Oct. 18, 1999, IEEE, New York, USA, XP002171162.

* cited by examiner

*Primary Examiner*—Marc S. Hoff
*Assistant Examiner*—Edward Raymond
(74) *Attorney, Agent, or Firm*—Frommer Lawrence & Haug LLP; William S. Frommer; Samuel S. Lee (57) ABSTRACT

A method is provided for extracting device status information from a device which includes an IEEE 1394 interface. Said device is instructed by a device status information tester connected to said device to execute device self tests and to provide corresponding self test results and device specific information for said device status information tester, wherein said reading and instructing procedures between said device status information tester and said device are performed on the basis of a low level communication protocol of said IEEE 1394 interface.

21 Claims, 9 Drawing Sheets

| | Root Directory | Vendor_ID | Vendor_ID_Text_Descriptor | Optional entries for Vendor Icon(s) | Model_ID | Model_ID_Text_Descriptor | Optional entries for Model Icon(s) | Other mandatory entries, eg Node_Capabilities | ... | Unit Directory (eg AV/C) | Instance Directory | ... | HW_Version | ... |
|---|---|---|---|---|---|---|---|---|---|---|---|---|---|---|
| Key_ID | | $03_{16}$ | $01_{16}$ | | $17_{16}$ | $01_{16}$ | | | | $D1_{16}^*$ | $D1_{16}^*$ | | $04_{16}$ | |
| SDI | | M | M | | M | M | | | | M | M | | O | |
| 1212r | M | O | | O | O | | | | | O | M | | O | |

| Type 0 0 | Key_ID 03₁₆ | SO_Specification_type | SO_Specification_Version |

DEVICE DIAGNOSTICS

The invention relates to a method for extracting device status information of a device, and to necessary means for performing said method.

Electronic consumer devices are often repaired by service workshops which are servicing a broad variety of devices developed by different manufacturers. In order to facilitate the repairing process, the manufaturers usually integrate a diagnostic software into their electronic devices, in particular in high complexity devices. This diagnostic software can be used for fault finding, preferably together with an external diagnostic apparatus which controls the diagnostic software.

Document U.S. Pat. No. 5,916,287 for example discloses a modular automotive test and information system. In particular, an integrated control module is described to which at least one instrumentation module is connected via an IEEE1394 bus. Every instrumentation module is adapted to run diagnostic applications for a particular vehicle component.

Further, document EP 0 939 321 A1 describes a high speed serial test and measurement equipment interface and system using the same wherein a computer is used to control electronic test equipment. The computer acts as a controller to manage configuration and operation of the various test and measurement equipment.

However, as each different device type usually requires a different diagnostic apparatus, respectively, and as different device types usually are accessable via different communication/control protocols only, it is necessary to use a broad variety of different diagnostic apparatus or different control protocols, which in addition often requires the use of different interfaces connecting the device with the corrresponding diagnostic apparatus, respectively. The situation even complicates more if the devices are diagnosed via a network. This results in a costly and complex diagnostic equipment.

It is an object of the present invention to provide a method and necessary means to perform it which make it possible to facilitate the diagnostic process, in particular with respect to devices being connected to each other via an IEEE1394 network.

To solve this object, the present invention provides a method for extracting device status information of a device which is connected to an IEEE 1394 interface, which is characterized by a) reading out device specific information from said device, and/or b) instructing said device to execute device self tests and reading out corresponding self test results from said device, wherein steps a) and b) are performed on the basis of a low level communication protocol of said IEEE 1394 interface.

The present invention further provides a device status information tester for extracting device status information of a device which supports IEEE1394 and is connectable to said device status information tester, which is charaterized by an IEEE1394 interface, wherein said device status information tester provides functionality for communicating with said device via said IEEE1394 interface by using a low level communication protocol of said IEEE1394 interface.

Further, the present invention provides a device which is controllable by a device status information tester which supports IEEE1394, which is charaterized by an IEEE1394 interface, a storage means accessable for said device status information tester, a means for exectuing self tests and for providing said storage means with a result of said self tests, wherein a communication between said commanding device and said receiving means via said IEEE1394 interface is based upon a low level communication protocol of said IEEE1394 interface.

Last, the present invention provides a service diagnostic system, comprising a device status information tester according to anyone of the claims 6 to 8, a device according to anyone of the claims 9 to 16, and an IEEE1394 bus as a connection between said device and said device status information tester, wherein said device and said device status information tester communicate via said low level communication protocol over said respective IEEE1394 interfaces and said IEEE1394 bus.

Preferred embodiments of this method, device, device service information tester and service diagnostic system which are defined in independent claims 1, 6, 9 and 17, respectively, are respectively defined in the respective following dependent claims.

The service diagnostic system provided by the invention comprises a service diagnostic interface (in the following referred to as SDI) which is based upon the IEEE1212-2000/IEEE1394-1995 standard (in the following only referred to as IEEE1394 standard). As this standard is used in many devices, a broad variety of different device hardware may be used as a basis for the SDI. If a device should not directly support the IEEE1394 standard, it is possible in most cases to add an IEEE1394 interface to the device, thus making it compatible to the IEEE1394 standard, and therfore suitable as a basis for the SDI.

An important aspect of the present invention is that the principles of a SDI communication mechanism for communicating between the device and the device status information tester of the service diagnostic system are based upon existing communication mechanisms that are common to all different IEEE1394 communication/control protocol mechanisms used by different IEEE1394 supporting devices. This is achieved by using a low level communication protocol underlying all "real" communication/control protocols supported by the different IEEE1394 devices. Preferably, the low level communication protocol is based upon the Quadlet read/write protocol, which forms a basis of the IEEE1394 standard. The Quadlet read/write protocol allows four byte rate reading and writing.

An advantage thereof is that the SDI communication mechanism can be implemented at low cost, as it is only necessary to introduce a minimum of new functionality for directly using the low level communication protocol. Further, the SDI communication mechanism is independent of any "higher" communication/control protocol applied over IEEE1394 (for example AV/C (audio, video/control)), thus making it applicable to any device which comprises an IEEE1394 interface.

IEEE1394 interfaces may be a part of SDI software and/or SDI hardware, which is preferaby located in both the device status information tester and the device. The SDI further comprises a connection between the device and the device status information tester, for example an IEEE1394 serial bus. Further, the SDI software/hardware of the device status information tester and the device may comprise additional software to control the respective IEEE1394 interfaces.

The device status information tester preferably is a computing device, for example a PC (Personal Computer), but is not restricted thereto. Every hardware or software which provides the functionality needed to extract device status information can be regarded as device status information tester (in the following only referred to as tester).

If several devices to be controlled by the tester are connected via an IEEE1394 network, then at least some of the devices may comprise two or more IEEE1394 interfaces, respectively. In this case, the device status information tester may also comprise two or more IEEE1394 interfaces, depending on the structure of the network connecting the different devices and the device status information tester with each other, respectively. Thus, in such a case, the corresponding SDI comprises more than two IEEE1394 interfaces.

The SDI software of the tester and the device may be divided into SDI common software and SDI specific software, respectively. That is, the SDI specific software acts like an adaption layer to "connect" the SDI specific software, which is device dependent, to the SDI common software which is device independent. The advantage thereof is that in case of a new device supporting SDI only the SDI specific software has to be adapted, the SDI common software remains untouched.

The SDI software/hardware, preferably the SDI common software of the tester provides at least a part of the following functionality:
a) instructing the devices connected to the tester to execute self tests,
b) reading out corresponding self test results from the device and displaying the self test results,
c) reading out device specific information from the device and displaying the device specific information,
d) choosing, starting and controlling device specific diagnostic/service software according to a result of the read out device specific information and/or the self test results.

The device specific information for example comprises a name of the manufacturer of the device, a device model number and a textual description of the device. The device specific information is preferably not changeable by the tester.

This is achieved for example by keeping it in a ROM (read only memory) storage. By reading out all accessible device specific information of all connected devices, the tester is capable of generating a list of all connected devices.

In the following description, the sum of self test result information and device specific information will be referred to as device status information.

The SDI software/hardware, preferably the SDI common software/hardware of the device provides at least a part of the following functionality:
e) starting and controlling a built-in self test software of the device,
f) providing and updating information like self test results in a storage means of the device which is accessible by the tester.

To instruct the device, for example to instruct the device to start the buit-in self test software, the tester writes command information into the storage means, preferably into command register within the storage means, which is then interpreted by the device. To provide the tester with device status information (for example test results), the device writes the device status information into the storage means, preferably into status register within the storage means. The tester reads the device status information out of the storage means, and processes it. The tester may for example check at regular time intervals if the content of the storage means has changed, and exclusively read out status information that has changed.

The communication/controlling process decribed above is preferably executed by using the low level communication protocol exclusively.

To instruct the tester and to display extracted device status information, the tester preferably comprises a user interface.

Via the user interface, the user may for example first start a general diagnostic software stored within the tester which identifies accessable devices in the network by extracting device specific information, respectively. All identified devices may be sorted and displayed to the user. To test the identified devices, the user may start for each device to be tested an individual testing software which manages the start of the respective buit-in self test software and the extraction of the test results. The steps described above may also be executed automatically by the tester itself.

The device may comprise both an IEEE1394 interface and a remote connection capability. In this case, the device can be diagnosed by a remote tester via a remote connection, for example the internet or the telephone.

Further features and advantages of a preferred embodiment according to the present invention will be explained below in conjunction with the accompanying drawings, in which FIG. 2 shows a list of root directory entries being relevant for the SDI according to the present invention;

In the following description, making reference to FIGS. 1 to 9, a preferred embodiment of a storage means of a device supporting SDI is exemplary described.

Figure 3:
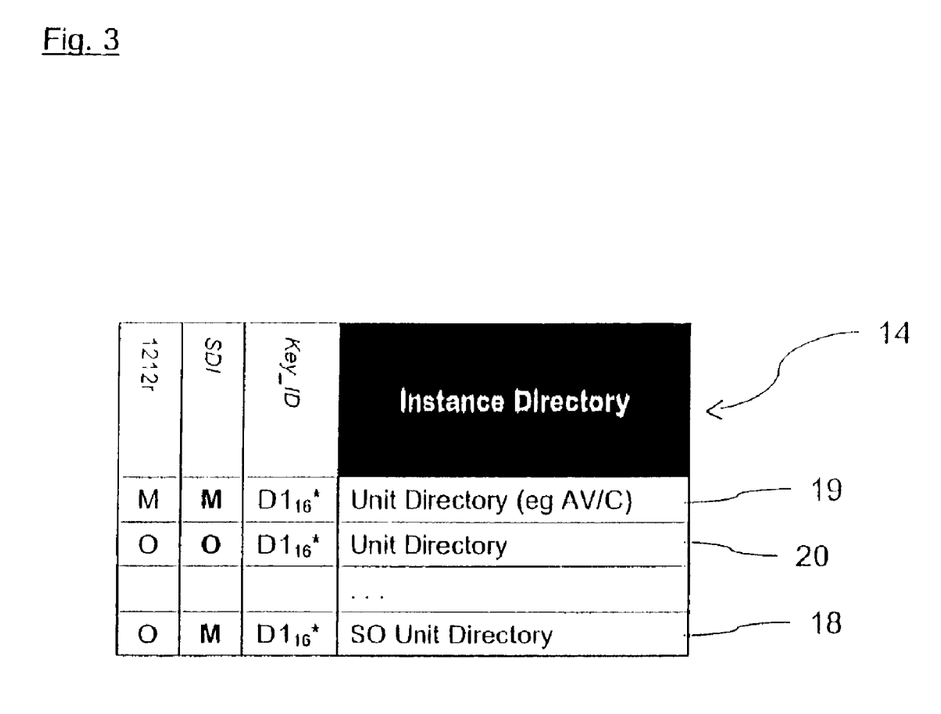
FIG. 3 shows a list of instance directory entries being relevant for the SDI according to the present invention.
Figure 4:
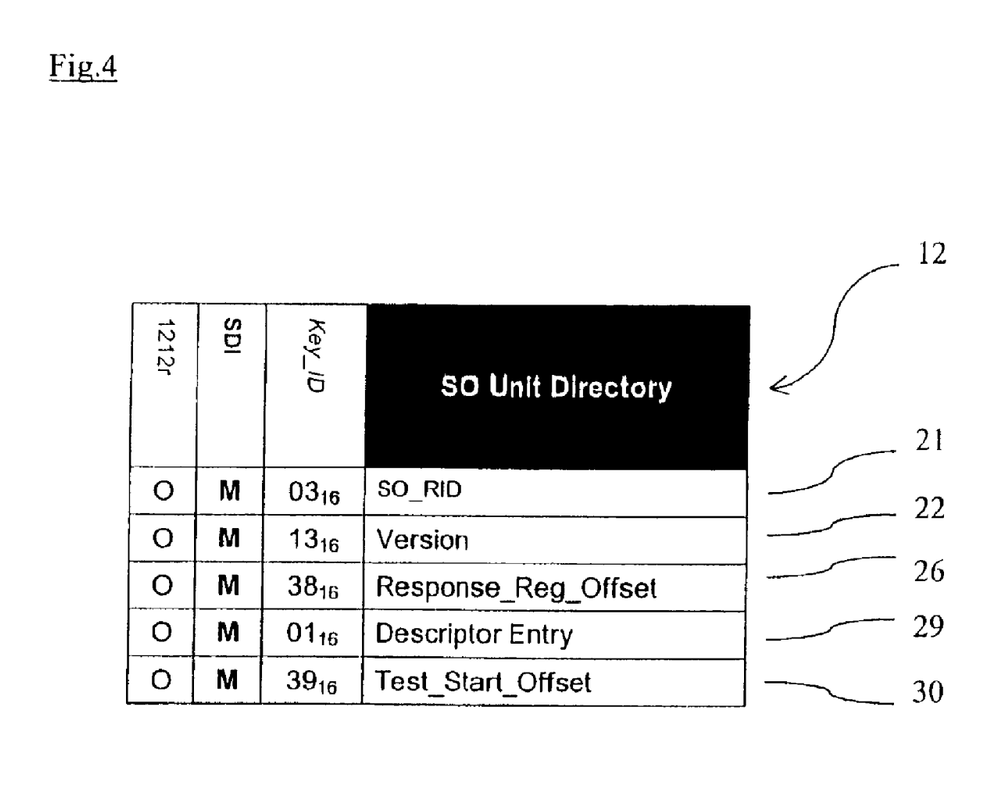
FIG. 4 shows a list of a specifying organization unit directory entries being relevant for the SDI according to the present invention.

In FIGS. 2, 3 and 4, "M" means "mandatory", and "O" means "optional", wherein the columns "SDI" refers to the service diagnostic interface according to the present invention, and the columns "1212r" to the known IEEE1212-2000 standard already referred to.

Figure 1:
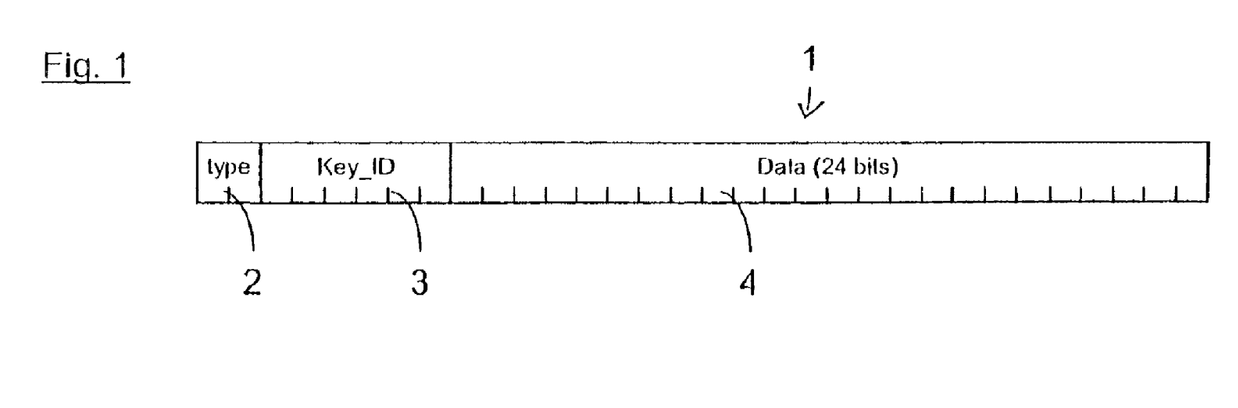
FIG. 1 shows a schematic drawing of a data format used to store device status information and other information being relevant to the SDI according to the present invention.

As the SDI is based upon the IEEE1212-2000 standard, SDI relevant information information has to be stored within the device according to the IEEE1212-2000 specification. That is, SDI relevant information is stored in a storage means using a first data-structure 1 which comprises a preferably two-bit type field 2, a preferably six-bit Key_ID field 3 and a preferably 24-bit Data field 4. The type field 2 describes whether information of the Data field 4 represents "immediate" information or offset information (to a location in a memory, to a leaf or a directory). The Key_ID field 3 specifies the type of the information (e.g. "Vendor_ID") which is contained in the Data field 4.

The storage means preferably comprises a directory hirarchy. Parts of that directory hirarchy are already existing in the IEEE1212 standard. The invention uses this directory hirarchy, which comprises a root directory 5 providing the following root directory entries of the first data-structure 1 as SDI relevant information, as shown in FIG. 2:

a) A Vendor_ID entry 6, which contains a registration authority ID (RID) of the manufacturer of the device. In case of Original Equipment Manufacturer (OEM) products, this may either be the RID of the manufacturer or of the vendor of the device.

b) A Vendor_ID_Text_Descriptor entry 7 which points to a string that contains the manufacturer's name. In case of OEM products, this may either be the name of the manufacturer or the name of the vendor of the device, and may differ from the owner of the RID specified in the Vendor_ID entry 6. Preferably, the Vendor_ID_Text_Descriptor entry 7 immediately follows the Vendor_ID entry 6. There may be additional entries 8 following the Vendor_ID_Text_Descriptor entry 7 for specifying vendor icons.

c) A Model_ID entry 9 comprising an identification of a model number.

d) A Model_ID_Text_Descriptor entry 10 preferably following immediately after the Model_ID entry 9, which comprises an offset to a string containing a model name.

e) A Unit_Directory entry 11 which comprises an offset to a unit directory, for example to a specifying organization unit directory 12, which may be a SDI unit directory. There must be at least one unit directory in every device, corresponding to the protocol that the device uses. The offset is preferably relative to the current Unit_Directory entry 11.

f) An Instance_Directory entry 13 comprising an offset to an instance directory 14, preferably relative to the current Instance_Directory entry 13.

g) An optional HW_Version entry 15 comprising an identification number for diagnostic/test software.

The root directory 5 may further comprise optional entries for model icons 16, for example, and/or additional mandatory entries 17 containing information about node capabilities, for example.

The combination of information of the Model_ID entry 9 and of the Vendor_ID entry 6 is normally sufficient to identify a corresponding diagnostic/test software to be used by a tester to diagnose the device. However, the HW_Version entry 15 may optionally specify this diagnostic/test software.

If only one language is used within the strings to which the Text_Descriptor entries 7, 10 are pointing to, then the text contained in the strings preferably uses a Minimal one-byte ASCII character set. The text can be specified by an offset, a leaf or a leaf directory. The tester must read the Minimal one-byte ASCII string. If more than one language is used, then the Text_Descriptor entries 7, 10 should point to a leaf directory which contains the text, with the Minimal one-byte ASCII string as the first entry. The tester does only have to read the Minimal one-byte ASCII string.

The directory hirarchy of the storage means comprises the instance directory 14 as a subdirectory of the root direcory 5, as shown in FIG. 3. The instance directory 14 generally comprises pointer entries to unit directories of the device. There must be generally at least one unit directory in each devive corresponding to the control protocol used by the device. This is indicated in the instance directory 14 by the entries 19 and 20. According to the present invention, the instance directory 14 comprises an additional SO_Unit_Directory entry 18 which points to a specifying organization unit directory 12 containing at least parts of device specific functionality and parts of common functionality needed to specify the SDI, i.e. needed to communicate using the low level communication protocol. The exact values of the entries of the specifying organization unit directory 12 can be determined by a specifying organization on their own, so there is the freedom that each specifying organization/company chooses its own specific entry values, which do not affect the core of the present invention.

In the following, entries of the unit directory 12 will be explained, as shown in FIG. 4. The specifying organization unit directory 12 as a subdirectory of the instance directory 14 comprises:

h) A SO_RID entry 21 which identifies the unit directory 12 as specifying organization unit directory and preferably shows the registration authority ID of the specifying organization.

i) A Version entry 22 identifying a SDI specification of a specifying organization and a version thereof.

Figure 5:
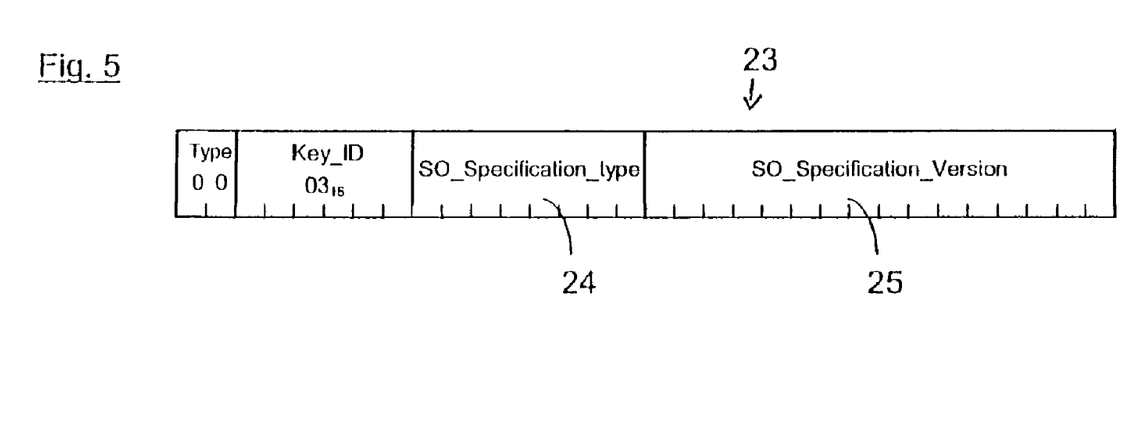
FIG. 5 shows a schematic drawing of a data format of a Version entry in the specifying organization unit directory according to the present invention.
Figure 6:
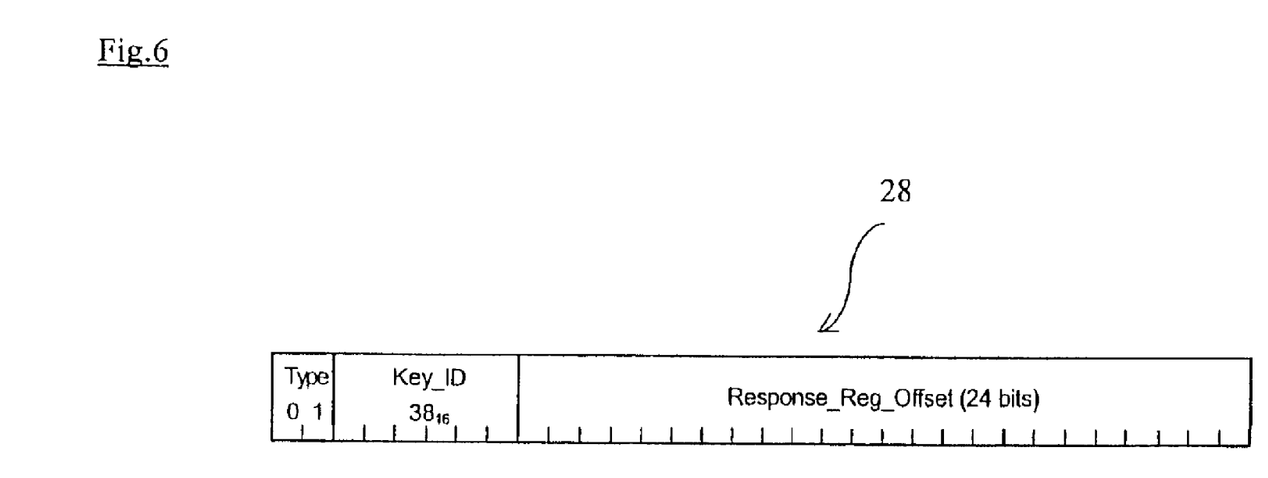
FIG. 6 shows a schematic drawing of a data format of a Response_Reg_Offset entry in the specifying organization unit directory according to the present invention.
Figure 7:
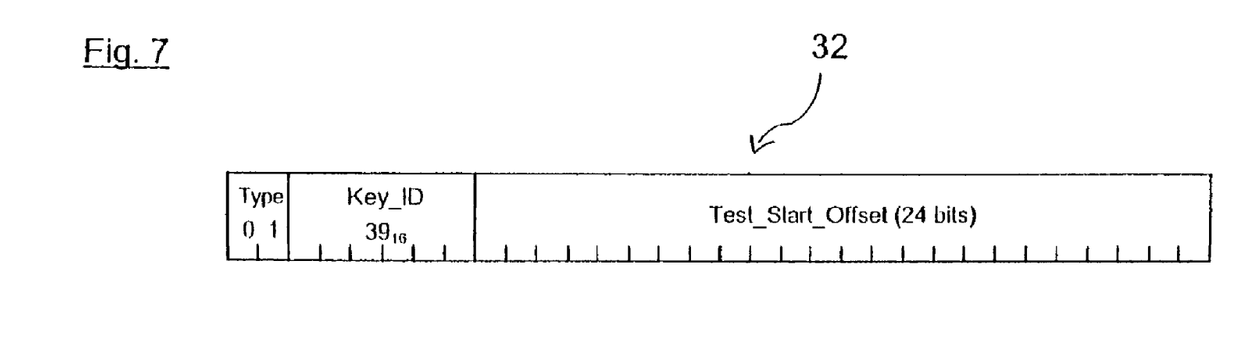
FIG. 7 shows a schematic drawing of a data format of a Test_Start_Offset entry in the specifying organization unit directory according to the present invention.

As shown in FIG. 5, a corresponding second data-structure 23 of this entry comprises a SO_Specification_Type field 24, which identifies the SDI specification of a corresponding specifying organization and its version. Here, this field preferably shows the value $01_{16}$, and all other values are reserved. Generally, all exact values of directory entries serve only as examples and may be set to other values. This also means that the values do not have to be written necessarily in hexadecimal like in this embodiment. A SDI supporting device may be identified by the combination of the SO_RID entry 21 and the value $01_{16}$ of the SO_Specification_Type field 24. The second data-structure 23 of the Version entry 22 further comprises a SO_Specification_Version entry 25 identifying the version of a SO_Specification_Type contained in the SO_Specification_Type field 24, which is represented in a major_version and a revision. For example, a first version of a specification will be version 1.0, which yields a major_version of $01_{16}$ and a revision of 0.

j) A Response_Reg_Offset entry 26 comprising an offset to a status register Response_Register represented by a third data-structure 27. The value of a respective Key_ID field preferably is $38_{16}$. A fourth data-structure 28 of the Response_Reg_Offset entry 26 is shown in FIG. 6.

k) A Descriptor entry 29 comprising an offset preferably relative to the current directory entry for an optional text string which can be used to provide information to the tester.

l) A Test_Start_Offset entry 30 comprising an offset to a command register Test_Start_Register represented by a data fifth data-structure 31. The value of a respective Key_ID field is $39_{16}$. A sixth data-structure 32 of the Test_Start_Offset entry 30 is shown in FIG. 7.

Figure 8:
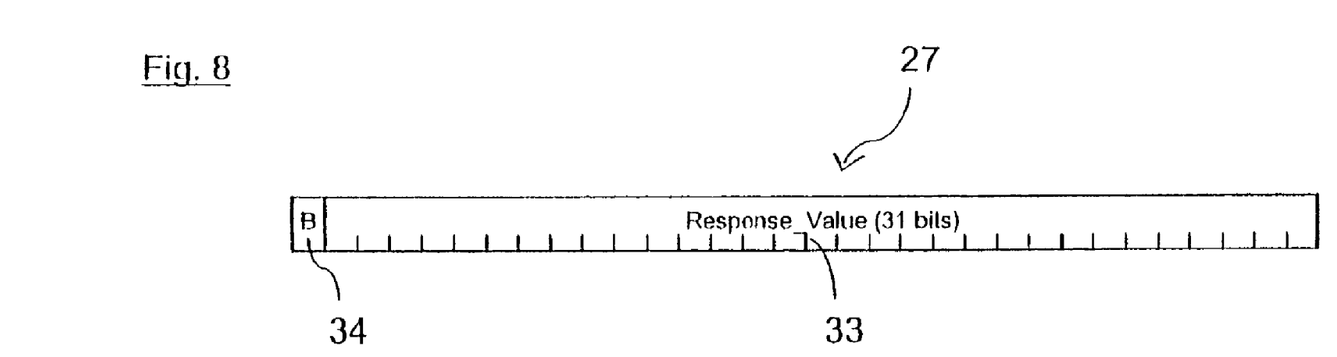
FIG. 8 shows a schematic drawing of a data format of a status register Response_Register according to the present invention.

The status register Response_Register is used to provide device status information to be read out by the tester. The third data-structure 27 of this The Response_Register is shown in FIG. 8. It comprises a 31-bit response field 33 and a Busy_Flag field 34, which can show the values "0" or "1".

Figure 9:
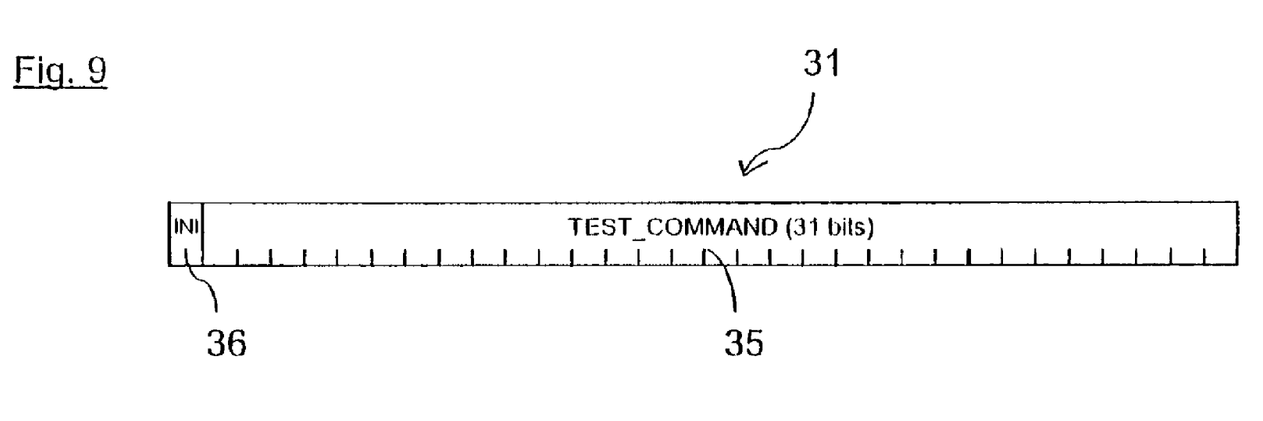
FIG. 9 shows a schematic drawing of a data format of a command register Test_Start_Register according to the present invention.

The command register Test_Start_Register is represented by a data structure 31 comprising a Test_Command field 35 which can be filled by the tester with command information. The Test_Start_Register 31 further comprises an INI_Flag field 36 which can show the values "0" or "1", as shown in FIG. 9.

The device executes the following steps when a command in form of command information including an INI_Flag set to a the value "1" is written by the tester into the command register Test_Start_Register of said device:

The execution of said command is started, thereby the Busy_Flag in said Busy_Flag field 34 of the status register Response_Register is set to the value "1", and the INI_Flag is set to the value "0".

A corresponding self test result as device status information is written into the 31-bit response field 33 of the status register Response_Register after having completed the command, the Busy_Flag is set to the value "0", wherein the self test result is read out of the 31-bit response field 33 of the status register Response_Register 27 by the tester after the INI_Flag has been set from the value "1" to the value "0" by the device, and the read out self test result is interpreted according to an actual value of said Busy_Flag. That is, when the tester sees the "1" to "0" transition of the Busy_Flag the content of the remaining 31 bits of the read out self test result is complete and can be interpreted therefore.

Preferably, the tester immediately starts to read out the self test result of the response field 33 of the status register Response_Register 27 after the INI_Flag has been set from the value "1" to the value "0" by the device, and keeps then "poll-reading" the self test result of the response field 33 and the Busy_Flag field 34 of the status register Response_Register 27, i.e. the tester reads at several times, each time prooving if the "1" to "0" transition of the Busy_Flag-has already happened. If the transition has happened, then the tester knows that the read out self test result of the response field 33 is complete. This mechanism is required as the execution of the command by the device usually takes a few seconds, and the tester can only find out if the command is already completed by permanently prooving the Busy_Flag, which means by permanently reading out the whole status register Response_Register 27.

All reading/writing procedures by the tester are preferably performed by using the asynchronous Quadlet read/write protocol.

All offsets preferably point to a CSR (control and status register) memory.

What is claimed is:

1. Method for extracting device status information of a device which is connected to an IEEE 1394 interface, characterized by
   a) reading out device specific information from said device, and/or
   b) instructing said device to execute device self tests and reading out corresponding self test results from said device, wherein steps a) and b) are performed by exclusively using a low level communication protocol of said IEEE 1394 interface.

2. Method according to claim 1, characterized in that said low level communication protocol uses a Quadlet read/write protocol.

3. Method according to claim 1, characterized by writing command information into a storage means of said device to instruct said device to perform self tests.

4. Method for extracting device status information of a device which is connected to an IEEE 1394 interface, characterized by
   a) reading out device specific information from said device, and/or
   b) instructing said device to execute device self tests and reading out corresponding self test results from said device, wherein steps a) and b) are performed on the basis of by exclusively using a low level communication protocol of said IEEE 1394 interface
   wherein said device executes the following steps after a command is written in form of said command information including an INI_Flag (36) set to a first value into said storage means of said device:
   starting to execute said command, thereby
   c) setting a Busy_Flag (34) in said storage means to a first value,
   d) changing said INI_Flag (36) to a second value,
   writing a corresponding self test result into said storage means after having completed said command,
   setting said Busy_Flag (34) to a second value, wherein said self test result is read out of said storage means after said INI_Flag (36) has been set to said second value, and said read out self test result is interpreted according to an actual value of said Busy_Flag (34).

5. Method according to claim 1, characterized by reading at least parts of a content of said storage means of said device into which said device writes device specific information and/or self test results to extract device status information.

6. Device status information tester for extracting device status information of a device which supports IEEE1394 and is connectable to said device status information tester, characterized by
   an IEEE 1394 interface, wherein
   said device status information tester provides functionality for communicating with said device via said IEEE1394 interface by exclusively using a low level communication protocol of said IEEE1394 interface.

7. Device status information tester according to claim 6, characterized by a user interface for instructing said device status information tester and for displaying extracted device status information.

8. Device according to claim 6, characterized in that said low level communication protocol comprises functionality of a Quadlet read/write protocol.

9. Device which is controllable by a device status information tester which supports IEEE 1394, characterized by
   an IEEE1394 interface,
   a storage means accessible for said device status information tester,
   a means for executing self tests and for providing said storage means with a result of said self tests, wherein a communication between said commanding device and said receiving means via said IEEE1394 interface is performed by exclusively using a low level communication protocol of said IEEE1394 interface.

10. Device according to claim 9, characterized in that said low level communication protocol comprises functionality of a Quadlet read/write protocol.

11. Device according to claim 9, characterized in that at least parts of device specific information and parts of functionality needed for using said low level communication protocol is located within a directory structure being part of said storage means of said device.

12. Device according to claim 11, characterized in that a root directory (5) of said directory structure comprises device specific information entries and offset entries for subdirectories containing information and functionality concerning the use of said low level communication protocol.

13. Device according to claim 12, characterized in that said root directory (5) comprises:
   a Vendor_ID entry (6) comprising information about a vendor and/or manufacturer of said device,
   a Vendor_ID_Text_Descriptor entry (7) comprising additional information about said vendor and/or manufacturer of said device,
   a Model_ID entry (9) comprising model number information of said device, a Model_ID_Text_Descriptor entry (10) comprising additional model number information, a Unit_Directory offset entry (11) comprising an offset to a unit directory as a subdirectory of said root directory, an Instance_Directory (13) offset entry comprising an offset to an instance directory as a subdirectory of said root directory.

14. Device according to claim 13, characterized in that said instance directory comprises a specifying organization Unit_Directory offset entry (11).

15. Device according to claim 14, characterized in that said service diagnostic interface unit directory (12) comprises a SO_RID entry (21) identifying said directory as a specifying organization unit directory, a Version entry (22) comprising specifying organization specific version information about the service diagnostic interface implemented, a status register Response_Reg_Offset entry (26) comprising an offset to a status register, a Descriptor entry (29) comprising optional information, and a command register Test_Start_Offset entry (30) comprising an offset to a command register.

16. Device according to claim 9, characterized in that said storage means comprises a configuration ROM including at least parts of said device specific information and parts of said functionality needed for said low level communication protocol.

17. Service diagnostic system, comprising:

a device status information tester for extracting device status information of a device which supports IEEE1394 and is connectable to said device status information tester having an IEEE1394 interface, wherein said device status information tester provides functionality for communications with said device via said IEEE1394 interface by exclusively using a low level communication protocol of said IEEE1394 interface;

a device having storage means accessible for said device status information tester, a means for executing self tests and for providing said storage means with a result of said self tests, wherein a communication between said commanding device and said device via said IEEE1394 interface is based upon a low level communication protocol of said IEEE1394 interface; and an IEEE1394 bus as a connection between said device and said device status information tester, wherein said device and said device status information tester communicate via said low level communication protocol over said respective IEEE1394 interfaces and said IEEE1394 bus.

18. Service diagnostic system according to claim 17, characterized by a first service diagnostic system hardware and a first service diagnostic system software being located in said device status information tester, and a second service diagnostic system hardware and a second service diagnostic system software being located in said device, wherein said IEEE1394 interface of said device status information tester is part of said first service diagnostic system hardware and a first service diagnostic system software, and said IEEE1394 interface of said device is part of said second service diagnostic system hardware and a second service diagnostic system software.

19. Method for extracting device status information of a device which is connected to an IEEE 1394 interface, characterized by a) reading out device specific information from said device, and/or b) instructing said device to execute device self tests and reading out corresponding self test results from said device, wherein steps a) and b) are performed by exclusively using a Quadlet read/write protocol of said IEEE 1394 interface.

20. Device status information tester for extracting device status information of a device which supports IEEE1394 and is connectable to said device status information tester, characterized by an IEEE 1394 interface, wherein said device status information tester provides functionality for communicating with said device via said IEEE1394 interface by exclusively using a Quadlet read/write protocol of said IEEE1394 interface.

21. Device which is controllable by a device status information tester which supports IEEE 1394, characterized by an IEEE1394 interface, a storage means accessible for said device status information tester, a means for executing self tests and for providing said storage means with a result of said self tests, wherein a communication between said commanding device and said receiving means via said IEEE1394 interface is performed by exclusively using a Quadlet read/write protocol of said IEEE1394 interface.

* * * * *